United States Patent
Bavisi et al.

(10) Patent No.: US 9,203,138 B2
(45) Date of Patent: *Dec. 1, 2015

(54) SYSTEM AND METHOD FOR TUNING AN ANTENNA IN A WIRELESS COMMUNICATION DEVICE

(75) Inventors: Amit Bavisi, Gilbert, AZ (US); Pravin Premakanthan, Chandler, AZ (US)

(73) Assignee: Intel IP Corporation, Santa Clara, CA (US)

(*) Notice: Subject to any disclaimer, the term of this patent is extended or adjusted under 35 U.S.C. 154(b) by 416 days.

This patent is subject to a terminal disclaimer.

(21) Appl. No.: 13/352,083

(22) Filed: Jan. 17, 2012

(65) Prior Publication Data

US 2013/0183910 A1 Jul. 18, 2013

(51) Int. Cl.
*H01Q 1/24* (2006.01)
*H04B 1/00* (2006.01)

(52) U.S. Cl.
CPC ............... *H01Q 1/243* (2013.01); *H04B 1/006* (2013.01)

(58) Field of Classification Search
CPC ................................. H04B 5/00; H04W 4/008
USPC ................................. 455/121, 125, 129, 180.3
See application file for complete search history.

(56) References Cited

U.S. PATENT DOCUMENTS

| | | | |
|---|---|---|---|
| 5,629,653 A | 5/1997 | Stimson | |
| 6,697,633 B1 * | 2/2004 | Dogan et al. | 455/509 |
| 6,919,753 B2 | 7/2005 | Wang et al. | 327/513 |
| 6,954,180 B1 * | 10/2005 | Braun et al. | 343/702 |
| 6,993,297 B2 * | 1/2006 | Smith, Jr. | 455/82 |
| 7,257,416 B2 | 8/2007 | Lee et al. | 455/456.2 |
| 7,555,276 B2 | 6/2009 | Wilcox | |
| 7,834,813 B2 | 11/2010 | Caimi et al. | |
| 8,390,450 B2 * | 3/2013 | August et al. | 340/572.1 |
| 8,406,806 B2 * | 3/2013 | Wong | 455/550.1 |
| 2004/0009754 A1 | 1/2004 | Smith, Jr. | |
| 2006/0099963 A1 | 5/2006 | Stephens | 455/456.3 |
| 2006/0197624 A1 | 9/2006 | Jue | |
| 2006/0281423 A1 * | 12/2006 | Caimi et al. | 455/129 |
| 2007/0026838 A1 | 2/2007 | Staudinger et al. | |
| 2007/0142014 A1 | 6/2007 | Wilcox | |
| 2007/0197180 A1 | 8/2007 | McKinzie et al. | |
| 2007/0275691 A1 | 11/2007 | Boda | 455/404.2 |
| 2008/0049868 A1 * | 2/2008 | Brobston | 375/297 |
| 2010/0069115 A1 | 3/2010 | Liu | 455/556.1 |

(Continued)

FOREIGN PATENT DOCUMENTS

| | | |
|---|---|---|
| CN | 101038618 A | 9/2007 |
| CN | 101331685 A | 12/2008 |

(Continued)

OTHER PUBLICATIONS

U.S. Appl. No. 13/053,966; pp. 27, Mar. 22, 2011.

(Continued)

*Primary Examiner* — Andrew Wendell
*Assistant Examiner* — Maryam Soltanzadeh
(74) *Attorney, Agent, or Firm* — Baker Botts L.L.P.

(57) ABSTRACT

In accordance with the present disclosure, method may include receiving one or more environment parameter signals indicative of an environment of a wireless communication element. The method may also include communicating one or more control signals to an antenna tuner of the wireless communication element for controlling an impedance of the antenna tuner based on the one or more environment parameter signals.

15 Claims, 4 Drawing Sheets

(56) References Cited

U.S. PATENT DOCUMENTS

| | | | |
|---|---|---|---|
| 2011/0086600 A1 | 4/2011 | Muhammad | 455/120 |
| 2011/0261734 A1 | 10/2011 | Dupuy et al. | 370/297 |
| 2011/0273164 A1 | 11/2011 | Dupuis | |
| 2012/0229228 A1 | 9/2012 | White | 333/33 |
| 2012/0243579 A1 | 9/2012 | Premakanthan et al. | |
| 2013/0169348 A1* | 7/2013 | Shi | 327/517 |
| 2013/0183910 A1 | 7/2013 | Bavisi et al. | 455/77 |
| 2014/0128032 A1* | 5/2014 | Muthukumar | 455/411 |

FOREIGN PATENT DOCUMENTS

| | | | | |
|---|---|---|---|---|
| CN | 101496222 A | 7/2009 | | |
| CN | 1669218 B | 9/2010 | | |
| JP | 2009-065376 | 3/2009 | | H01Q 1/50 |
| WO | 2004/008634 A1 | 1/2004 | | |
| WO | WO 2009/124874 | 10/2009 | | H04B 1/04 |

OTHER PUBLICATIONS

Extended European Search Report received for European Patent Application No. 12160085.2, mailed on Apr. 25, 2013, 6 pages.

Notice of Allowance received for U.S. Appl. No. 13/053,966, mailed on Mar. 21, 2014, 6 pages.

Final Office Action received for U.S Appl. No. 13/053,966, mailed on Jan. 16, 2014, 5 pages.

Non-Final Office Action received for U.S. Appl. No. 13/053,966, mailed on May 16, 2014, 9 pages.

Office Action received for Chinese Patent Application No. 2012100835952, mailed on Dec. 23, 2013, 21 pages of English Translation and 11 pages of Chinese Office Action.

Patrick Hindle, "MEMS Tuner Modules Could Solve Handset Reception Problems", Microwave Journal; www.mwjournal.com; mailed on Jan. 24, 2011, 4 pages.

Office Action received for Chinese Patent Application No. 201210083595.2, 18 pages of English Translation and 11 pages of Chinese Office action, Sep. 9, 2014.

Non-Final Office Action received for U.S. Appl. No. 14/575,921; 9 pages, May 12, 2015.

Song et al., "A CMOS adaptive antenna-impedance-tuning IC operating in the 850MHz-to-2GHz band", ISSCC 2009, pp. 384-385, 385a, Feb. 8, 2009.

* cited by examiner

SYSTEM AND METHOD FOR TUNING AN ANTENNA IN A WIRELESS COMMUNICATION DEVICE

TECHNICAL FIELD

The present disclosure relates generally to wireless communication and, more particularly, to tuning of an antenna in a wireless communication device.

BACKGROUND

Wireless communications systems are used in a variety of telecommunications systems, television, radio and other media systems, data communication networks, and other systems to convey information between remote points using wireless transmitters and wireless receivers. A transmitter is an electronic device which, usually with the aid of an antenna, propagates an electromagnetic signal such as radio, television, or other telecommunications. Transmitters often include digital signal processing circuits which encode a data signal, upconverts it to a radio frequency signal, and passes it signal amplifiers which receive the radio-frequency, amplify the signal by a predetermined gain, and transmit the amplified signal through an antenna. On the other hand, a receiver is an electronic device which, also usually with the aid of an antenna, receives and processes a wireless electromagnetic signal. In certain instances, a transmitter and receiver may be combined into a single device called a transceiver.

Many wireless transceivers, particularly in those integral to handheld wireless devices (e.g., cellular phones) may suffer from over-the-air performance degradation due to what has been termed in the industry as "hand and head effects." Hand and head effects may occur as a result of proximity of a user's head, hand, or other body part to an antenna of the transceiver. The proximity of such body parts to an antenna may cause a change in electrical properties of the antenna, for example changes in the effective load resistance, load capacitance, or load inductance. These changes in electrical characteristics can cause variations in the ratio of incident power to reflected power transmitted to an antenna, which may lead to performance degradation in transmitted signals.

SUMMARY

In accordance with the present disclosure, method may include receiving one or more environment parameter signals indicative of an environment of a wireless communication element. The method may also include communicating one or more control signals to an antenna tuner of the wireless communication element for controlling an impedance of the antenna tuner based on the one or more environment parameter signals.

Technical advantages of the present disclosure may be readily apparent to one skilled in the art from the figures, description and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
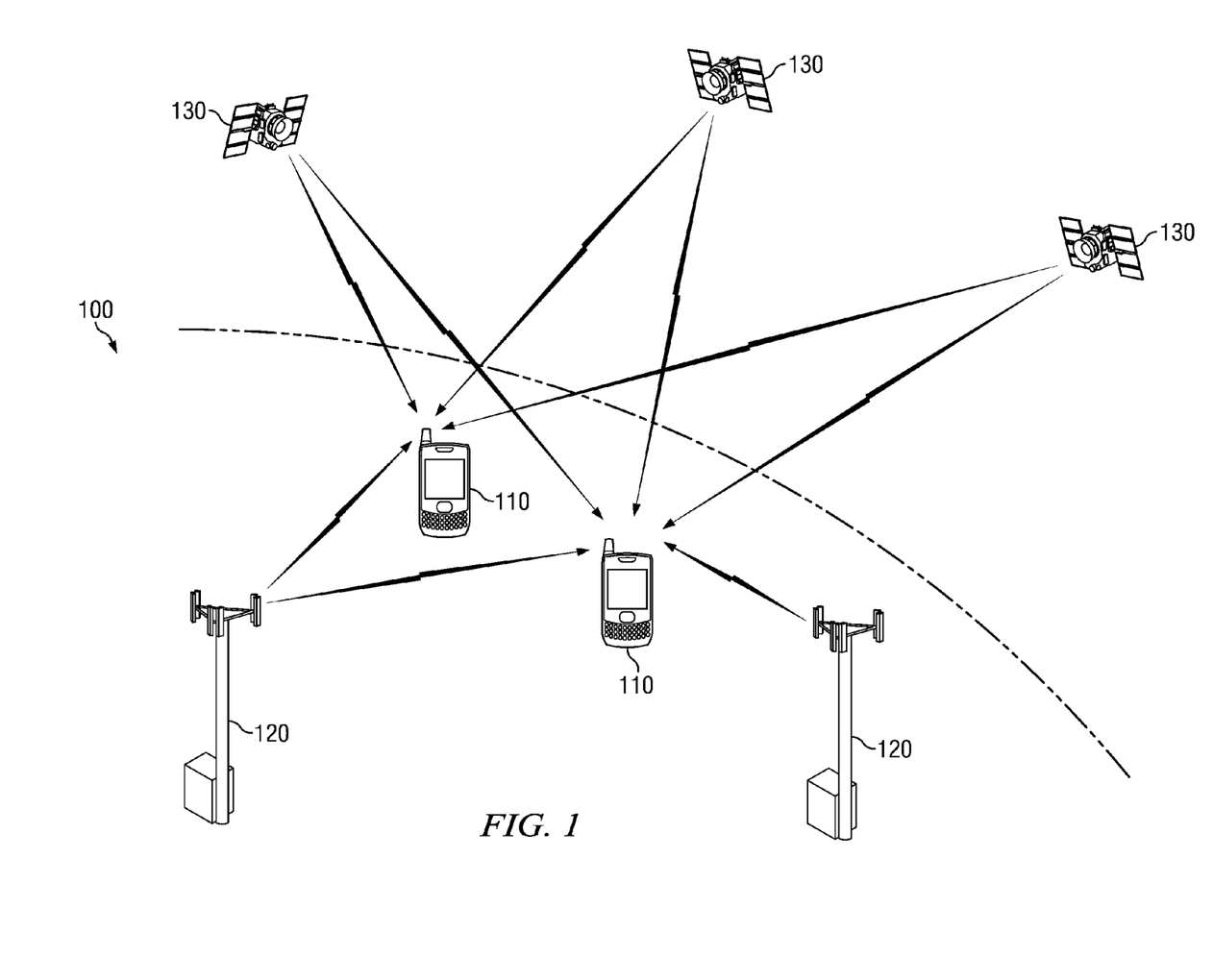
FIG. 1 illustrates a block diagram of an example wireless communication system, in accordance with certain embodiments of the present disclosure.

FIG. 1 illustrates a block diagram of an example wireless communication system 100, in accordance with certain embodiments of the present disclosure. For simplicity, only two terminals 110 and two base stations 120 are shown in FIG. 1. A terminal 110 may also be referred to as a remote station, a mobile station, an access terminal, user equipment (UE), a wireless communication device, a cellular phone, or some other terminology. A base station 120 may be a fixed station and may also be referred to as an access point, a Node B, or some other terminology.

A terminal 110 may or may not be capable of receiving signals from satellites 130. Satellites 130 may belong to a satellite positioning system such as the well-known Global Positioning System (GPS). Each GPS satellite may transmit a GPS signal encoded with information that allows GPS receivers on earth to measure the time of arrival of the GPS signal. Measurements for a sufficient number of GPS satellites may be used to accurately estimate a three-dimensional position of a GPS receiver. A terminal 110 may also be capable of receiving signals from other types of transmitting sources such as a Bluetooth transmitter, a Wireless Fidelity (Wi-Fi) transmitter, a wireless local area network (WLAN) transmitter, an IEEE 802.11 transmitter, and any other suitable transmitter.

In FIG. 1, each terminal 110 is shown as receiving signals from multiple transmitting sources simultaneously, where a transmitting source may be a base station 120 or a satellite 130. In certain embodiments, a terminal 110 may also be a transmitting source. In general, a terminal 110 may receive signals from zero, one, or multiple transmitting sources at any given moment.

System 100 may be a Code Division Multiple Access (CDMA) system, a Time Division Multiple Access (TDMA) system, or some other wireless communication system. A CDMA system may implement one or more CDMA standards such as IS-95, IS-2000 (also commonly known as "1x"), IS-856 (also commonly known as "1xEV-DO"), Wideband-CDMA (W-CDMA), and so on. A TDMA system may implement one or more TDMA standards such as Global System for Mobile Communications (GSM). The W-CDMA standard is defined by a consortium known as 3GPP, and the IS-2000 and IS-856 standards are defined by a consortium known as 3GPP2.

Figure 2:
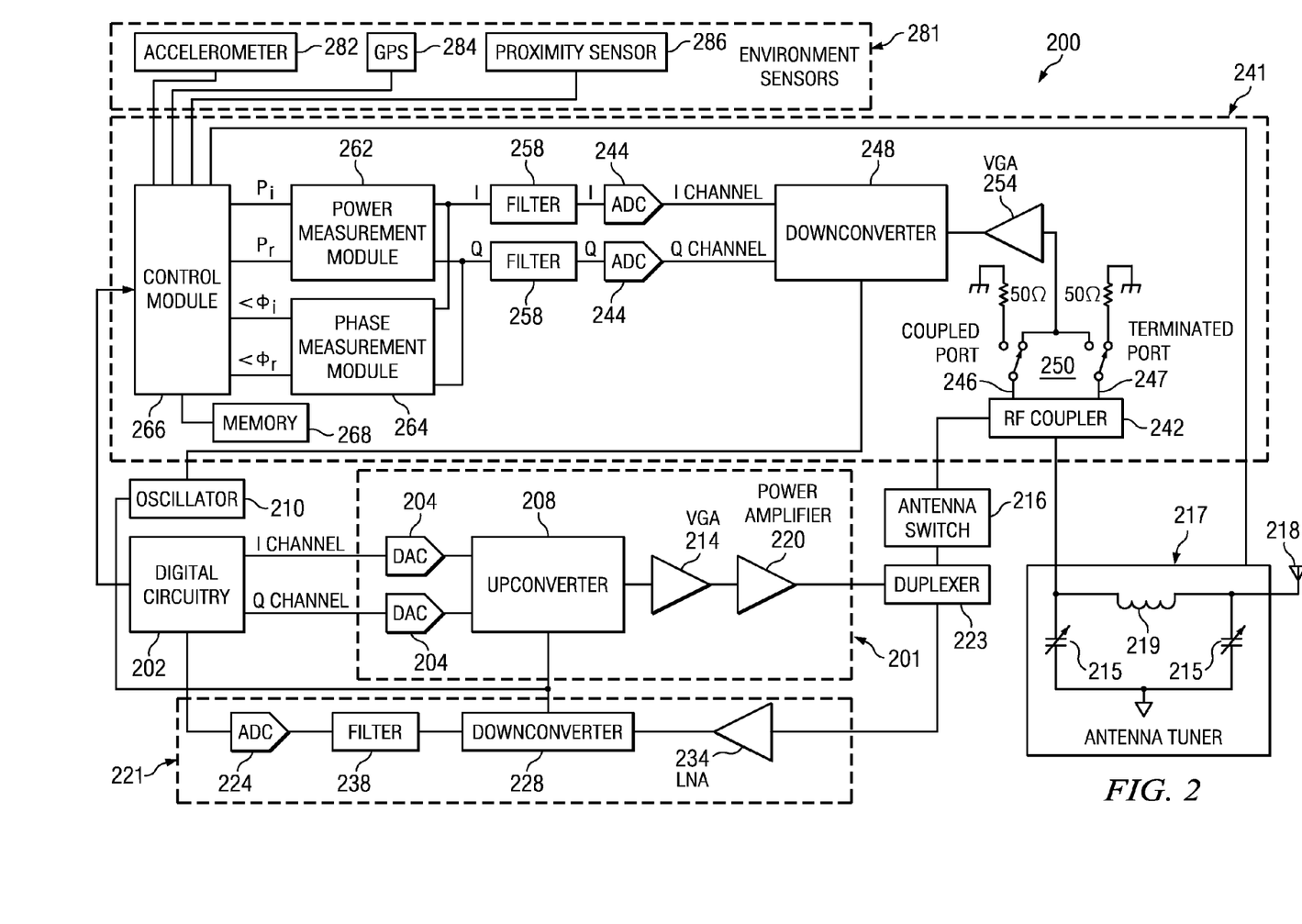
FIG. 2 illustrates a block diagram of selected components of an example transmitting and/or receiving element, in accordance with certain embodiments of the present disclosure.

FIG. 2 illustrates a block diagram of selected components of an example transmitting and/or receiving element 200 (e.g., a terminal 110, a base station 120, or a satellite 130), in accordance with certain embodiments of the present disclosure. Element 200 may include a transmit path 201, a receive path 221, and an antenna tuner control path 241. Depending on the functionality of element 200, element 200 may be considered a transmitter, a receiver, or a transceiver.

As depicted in FIG. 2, element 200 may include digital circuitry 202. Digital circuitry 202 may include any system, device, or apparatus configured to process digital signals and information received via receive path 221, and/or configured to process signals and information for transmission via transmit path 201. Such digital circuitry 202 may include one or more microprocessors, digital signal processors, and/or other suitable devices. As shown in FIG. 2, digital circuitry 202 may communicate in-phase (I) channel and quadrature (Q) channel components of a digital signal to transmit path 201.

Transmit path 201 may include a digital-to-analog converter (DAC) 204 for each of the I channel and Q channel. Each DAC 204 may be configured to receive its respective I or Q channel component of the digital signal from digital circuitry 202 and convert such digital signal into an analog signal. Such analog signal may then be passed to one or more other components of transmit path 201, including upconverter 208.

Upconverter 208 may be configured to frequency upconvert an analog signal received from DAC 204 to a wireless communication signal at a radio frequency based on an oscillator signal provided by oscillator 210. Oscillator 210 may be any suitable device, system, or apparatus configured to produce an analog waveform of a particular frequency for modulation or upconversion of an analog signal to a wireless communication signal, or for demodulation or downconversion of a wireless communication signal to an analog signal. In some embodiments, oscillator 210 may be a digitally-controlled crystal oscillator.

Transmit path 201 may include a variable-gain amplifier (VGA) 214 to amplify an upconverted signal for transmission, and a power amplifier 220 to further amplify the analog upconverted signal for transmission via antenna 218. The output of power amplifier 220 may be communicated to duplexer 223. A duplexer 223 may be interfaced between antenna switch 216 and each transmit path 201 and receive path 221. Accordingly, duplexer 223 may allow bidirectional communication through antenna tuner 217 and antenna 218 (e.g., from transmit path 201 to antenna 218, and from antenna 218 to receive path 221).

Antenna switch 216 may be coupled between duplexer 224 and antenna tuner 217. Antenna switch 216 may configured to multiplex the output of two or more power amplifiers (e.g., similar to power amplifier 220), in which each power amplifier may correspond to a different band or band class. Antenna switch 216 may allow duplexing of signals received by antenna 218 to a plurality of receive paths of different bands or band classes.

An antenna tuner 217 may be coupled between antenna switch 216 and antenna 218. Antenna tuner 217 may include any device, system, or apparatus configured to improve efficiency of power transfer between antenna 218 and transmit path 201 by matching (or attempting to closely match) the impedance of transmit path 201 to antenna 218. Such matching or close matching may reduce the ratio of reflected power to incident power transferred to the antenna from transmit path 201, thus increasing efficiency of power transfer. As shown in FIG. 2, antenna tuner 217 may include one or more variable capacitors 215 and an inductor 219. As discussed in greater detail below, the capacitances of variable capacitors 215 may be varied based on one or more control signals communicated from antenna tuner control path 241. As such capacitances are varied, the effective impedance of the combination of antenna tuner 217 and antenna 218 is varied. Thus, by setting the capacitances appropriately, the effective impedance of the combination of antenna tuner 217 and antenna 218 may be approximately matched to that of the remainder of transmit path 201.

Antenna 218 may receive the amplified signal and transmit such signal (e.g., to one or more of a terminal 110, a base station 120, and/or a satellite 130). As shown in FIG. 2, antenna 218 may be coupled to each of transmit path 201 and receive path 221. Duplexer 223 may be interfaced between antenna 218 and each of receive path and Receive path 221 may include a low-noise amplifier 234 configured to receive a wireless communication signal (e.g., from a terminal 110, a base station 120, and/or a satellite 130) via antenna 218, antenna tuner 217, and duplexer 223. LNA 224 may be further configured to amplify the received signal.

Receive path 221 may also include a downconverter 228. Downconverter 228 may be configured to frequency downconvert a wireless communication signal received via antenna 218 and amplified by LNA 234 by an oscillator signal provided by oscillator 210 (e.g., downconvert to a baseband signal). Receive path 221 may further include a filter 238, which may be configured to filter a downconverted wireless communication signal in order to pass the signal components within a radio-frequency channel of interest and/or to remove noise and undesired signals that may be generated by the downconversion process. In addition, receive path 221 may include an analog-to-digital converter (ADC) 224 configured to receive an analog signal from filter 238 and convert such analog signal into a digital signal. Such digital signal may then be passed to digital circuitry 202 for processing.

Antenna tuner control path 241 may in general be configured to sense signals representative of the incident power transmitted to antenna 218 and reflected power from antenna 218, and based at least on such sensed signals, communicate a control signal to antenna tuner 217 for tuning the impedance of antenna tuner 217 (e.g., tuning variable capacitors 215 to desired capacitances). As shown in FIG. 2, antenna tuner control path 241 may include a radio frequency (RF) coupler 242. RF coupler 242 may be any system, device or apparatus configured to couple at least a portion of the transmission power in the transmission line coupling antenna switch 216 to antenna tuner 217 to one or more output ports. As known in the art, one of the output ports may be known as a coupled port (e.g., coupled port 246 as shown in FIG. 2) while the other output port may be known as a terminated or isolated port (e.g., terminated port 247 as shown in FIG. 2). In many cases, each of coupled port 246 and terminated port 247 may be terminated with an internal or external resistance of a particular resistance value (e.g., 50 ohms). Due to the physical properties of RF coupler 242, during operation of element 200, coupled port 246 may carry an analog signal (e.g., a voltage) indicative of incident power transmitted to antenna 218 while terminated port 247 may carry an analog signal (e.g., a voltage) indicative of power reflected from antenna 218.

Input terminals of a switch 250 may be coupled to coupled port 246 and terminated port 247. At predefined or desired intervals, switch 250 may switch between closing a path between coupled port 246 and the input terminal of variable gain amplifier (VGA) 254 and closing a path between terminated port 247 and the input terminal of VGA 254. VGA 254 may amplify the signals alternatingly communicated via switch 250, and communicate such amplified signals to downconverter 248.

Downconverter 248 may be configured to frequency downconvert the alternating incident power signal and reflected power signal by an oscillator signal provided by oscillator 210 (e.g., downconvert to a baseband signal) and output an in-phase (I) channel and quadrature (Q) channel components of for each of the baseband incident power signal and baseband reflected power signal. In addition, control path 214 may include an analog-to-digital converter (ADC) 244 for each of the I channel and Q channel, each ADC 244 configured to receive the appropriate component of the baseband incident power signal and reflected power signal and convert such components from analog signals into a digital signals.

Control path 241 may also include a filter 258 for each of the I channel and Q channel components of the digital incident power signal and digital reflected power signal. In some embodiments, each filter 258 may comprise a moving-average filter (e.g., a cascaded integrator-comb filter) configured to produce at its output a moving average of signals received at its input. As a result, filters 258 may output I channel and Q channel components of the averaged digital incident power signal and I channel and Q channel components of the averaged digital reflected power signal.

As depicted in FIG. 2, control path 241 may also include a power measurement module 262. Power measurement module 262 may include any system, device, or apparatus configured to, based on the I channel and Q channel components of the averaged digital incident power signal and the I channel and the Q channel components of the averaged digital reflected power signal, calculate and output signals indicative of the magnitude of the incident power $|P_i|$ transmitted to antenna 218 and the magnitude of the reflected power $|P_r|$ reflected from antenna 218. For example, power measurement module 262 may calculate incident power in accordance with the equation $|P_i|=\sqrt{(|P_{iI}|^2+|P_{iQ}|^2)}$ and reflected power in accordance with the equation $|P_r|=\sqrt{(|P_{rI}|^2+|P_{rQ}|^2)}$, where $|P_{iI}|$ is the magnitude of the I channel component of the average digital incident power signal, $|P_{iQ}|$ is the magnitude of the Q channel component of the average digital incident power signal, $|P_{rI}|$ is the magnitude of the I channel component of the average digital reflected power signal, and $|P_{rQ}|$ is the magnitude of the Q channel component of the average digital reflected power signal.

Control path 241 may further include phase measurement module 264. Power measurement module 262 may include any system, device, or apparatus configured to, based on the I channel and Q channel components of the averaged digital incident power signal and the I channel and the Q channel components of the averaged digital reflected power signal, calculate and output signals indicative of the phase $\phi_i$ of the incident power transmitted to antenna 218 and the phase $\phi_r$ of the reflected power reflected from antenna 218. For example, phase measurement module 264 may calculate incident power phase in accordance with the equation $\phi_i=\tan^{-1}(P_{iQ}|P_{iI})$ and reflected power phase in accordance with the equation $\phi_i=\tan^{-1}(P_{rQ}|P_{rI})$ where $P_{iI}$ is the I channel component of the average digital incident power signal, $P_{iQ}$ is the Q channel component of the average digital incident power signal, $P_{rQ}$ is the I channel component of the average digital reflected power signal, and $P_{rQ}$ is the Q channel component of the average digital reflected power signal.

Control path 241 may additionally include a control module 266 configured to receive signals indicative of the incident power $|P_i|$, the magnitude of the reflected power $|P_r|$, the phase $\phi_i$ of the incident power, and the phase $\phi_r$ of the reflected power, and based at least on such received signals, calibrate antenna tuner 217 by outputting one or more control signals to antenna tuner 217 to control the impedance of antenna tuner 217 (e.g., by controlling the capacitances of variable capacitors 215). For example, to reduce reflected power relative to incident power (and thus improve power transmission), control module 266 may communicate control signals to antenna tuner 217 in order control the effective impedance of antenna tuner 217 such that the ratio of reflected power to incident power is minimized. As a specific example, the complex reflection coefficient for antenna 218 may be given by the equation $\Gamma=A+jB=V_r\angle\phi_r/V_i\angle\phi_i$, where A and B are the real and imaginary components of the complex reflection coefficient, and $V_r$ and $V_i$ are the reflected voltage and incident voltage. The reflection coefficient describes the return loss and, as shown above, may be given as the ratio between the reflected and incident power. The voltage standing wave ratio (VSWR) may be given as $(1+|\Gamma|)/(1-|\Gamma|)$. Given that $\Gamma=(Z_L-Z_0)/(Z_L+Z_0)$, where $Z_L$ is the present complex impedance of the antenna tuner and $Z_0$ represents known characteristic impedance of the transmission line coupled to antenna 218 (e.g., often equal to 50 ohms for many applications), control module 266 may solve for the impedance $Z_L$, and modify such impedance accordingly to reduce the complex reflection coefficient $\Gamma$. To further illustrate, the magnitude of the reflection coefficient may be given by $|\Gamma|=\sqrt{(|P_r|/|P_i|)}$ and the percentage of power delivered to antenna load $Z_L$ may be given as $1-|\Gamma|^2$.

Thus, to reduce reflected power relative to incident power (and thus improve power transmission), control module 266 may communicate control signals to antenna tuner 217 in order to reduce the complex reflection coefficient $\Gamma$.

In addition, control module 266 may receive environmental parameter signals from one or more environment sensors 281, wherein such environmental parameter signals are indicative of an orientation, location, and/or other parameter associated with wireless communication device. For example, environment sensors 281 may include an accelerometer 282. An accelerometer 282 may be any system, device, or apparatus configured to determine an orientation of wireless communication device 200 with respect to the center of the earth (e.g., a three-dimensional horizontal and vertical orientation of wireless communication device 200). As another example, environment sensors may include a global positioning system (GPS) 284 configured to determine a three-dimensional location of wireless communication device (e.g., latitude, longitude, and altitude). As a further example, environment sensors 281 may include a proximity sensor 286 configured to determine a proximity of wireless communication device 200 (or a portion thereof, such as a touch screen, for example) to a user of wireless communication device 200. Although FIG. 2 depicts specific environment sensors 281, other environment sensors 281 may be present in embodiments of the present disclosure.

In operation, control module 266 may, based on such received environmental parameter signals from environment sensors 281, store a calibrated antenna tuner setting associated with the environmental parameters to memory 268. In addition, control module 266 may, based on such received environmental parameter signals from environment sensors 281, recall a calibrated antenna tuner setting associated with the environmental parameter signals previously stored to memory 268, and output one or more control signals to antenna tuner 217 to control the impedance of antenna tuner 217 based on the recalled antenna tuner setting. Accordingly, once antenna tuner 217 has been calibrated for a particular environment (e.g., as defined by environmental parameter signals), the antenna tuner 217 calibration for such particular environment may be saved for later recall, thus reducing or eliminating the need for re-calibration when a wireless communication device reencounters the particular environment at a later time. By reducing or eliminating the need for re-calibration, power usage and processing overhead associated with antenna tuner calibration may be reduced.

Memory 268 may be communicatively coupled to control module 266 and may include any system, device, or apparatus configured to retain data for a period of time (e.g., computer-readable media). Memory 268 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to wireless communication device 200 is turned off. In operation, memory 268 may store one or more lists, tables, maps, databases, and/or other data structures associating environment parameter signals with antenna tuner calibration settings.

Portions of control path 241 (e.g., filters 258, power measurement module 262, phase measurement module 264, and/or control module 266) may be implemented as one or more microprocessors, digital signal processors, and/or other suitable devices.

Figure 3:
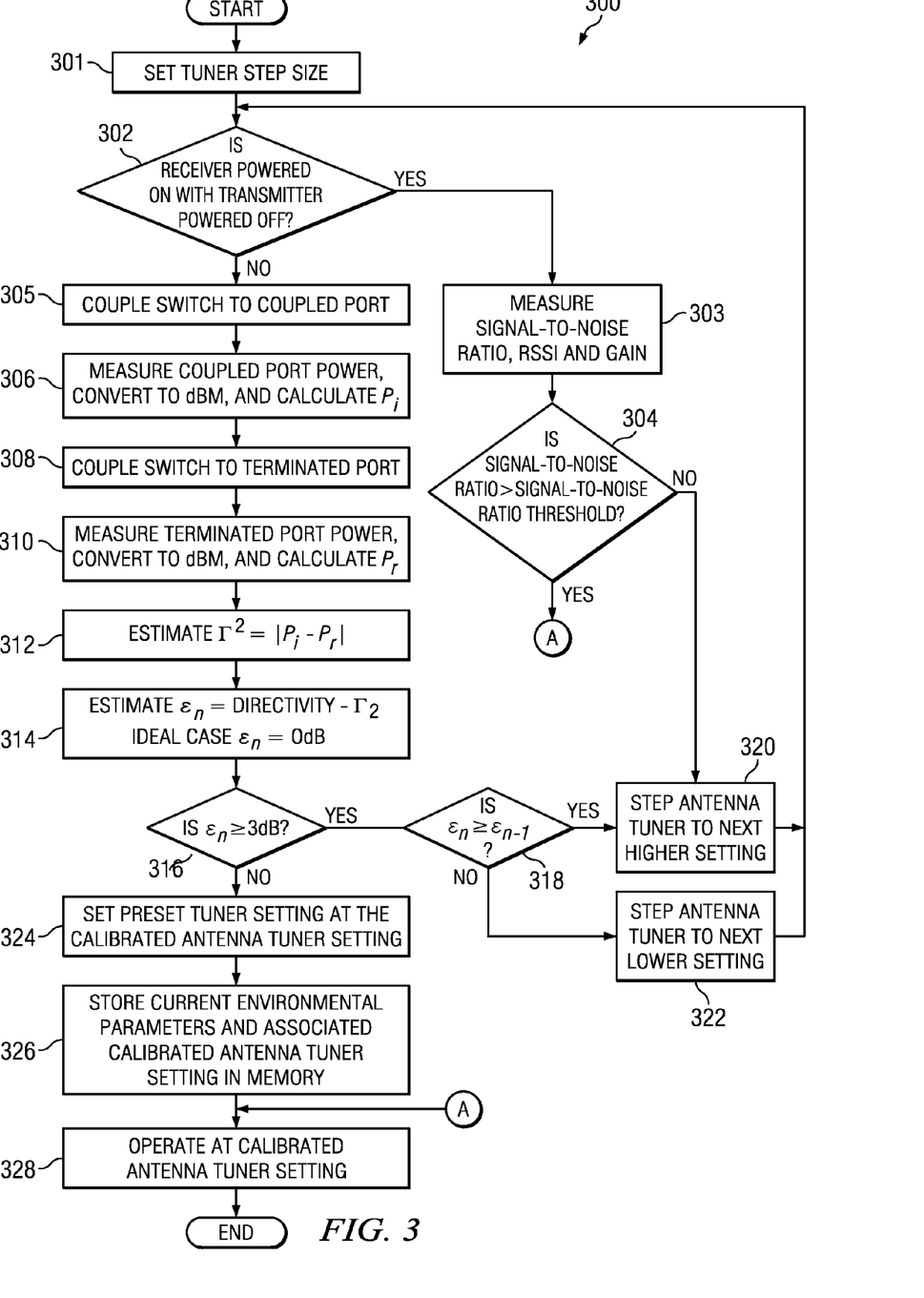
FIG. 3 illustrates a flow chart of an example method for calibrating an antenna tuner, in accordance with certain embodiments of the present disclosure.

FIG. 3 illustrates a flow chart of an example method 300 for controlling an antenna tuner, in accordance with certain embodiments of the present disclosure. According to one embodiment, method 300 preferably begins at step 302. As noted above, teachings of the present disclosure may be implemented in a variety of configurations of system 100. As such, the preferred initialization point for method 300 and the order of the steps 301-322 comprising method 300 may depend on the implementation chosen.

At step 301 control path 241 may set a tuner step size for antenna tuner 217 (e.g., based on the minimum amount of change in capacitance available by varying capacitance of varactors 215).

At step 302, wireless communication device 200 may determine if receive path 221 is powered on with transmit path 201 powered off. Such a determination may be made by control module 266 and/or other suitable component of wireless communication device 200. If wireless communication device 200 determines that receive path 221 is powered on with transmit path 201 powered off, method 300 may proceed to step 303. Otherwise, method 300 may proceed to step 305.

At step 303, in response to a determination that receive path 221 is powered on with transmit path 201 powered off, digital circuitry 202 may measure signal-to-noise ratio, receive signal strength indicator (RSSI), and/or gain of receive path 221. Control module 266 may have knowledge of RSSI based on measurements of the input signal of receive path 221 and knowledge of the gain of receive path 221 as control module 266 may set the gain based on RSSI in order to maximize signal-to-noise ratio (SNR). SNR may also be calculated by control module 266. Such measurements may be compared against settings for antenna tuner 217 and a programmed SNR threshold.

At step 304, wireless communication device 200 may determine whether the SNR of receive path 221 is above a threshold SNR. Such threshold SNR may be programmed into a memory of wireless communication device 221 based on engineering characterization and/or testing of wireless communication device 200 or devices similar thereto. If wireless communication device 200 determines that the signal-to-noise ratio is above a threshold signal-to-noise ratio, method 300 may proceed to step 328. Otherwise, method 300 may proceed to step 320.

At step 305, in response to a determination that receive path 221 is not powered on with transmit path 201 also powered off, switch 250 may switch to couple coupled port 246 to other elements of control path 241. At step 306, power management module 262, phase management module 264, and/or other components of control path 241 may sense a signal indicative of the coupled port power, convert the measurement to decibels referenced to one milliwatt (dBm), and calculate incident power $P_i$ (e.g., as described above in reference to FIG. 2).

At step 308, switch 250 may switch to couple terminated port 247 to other elements of control path 241. At step 310, power management module 262, phase management module 264, and/or other components of control path 241 may sense a signal indicative of the terminated port power, convert the measurement to decibels referenced to one milliwatt (dBm), and calculate reflected power $P_r$ (e.g., as described above in reference to FIG. 2).

At step 312, control module 266 may estimate the square of the reflection coefficient $\Gamma^2$ (e.g., by control module 266) based on the calculated incident power $P_i$ and calculated reflected power $P_r$ (e.g., $\Gamma^2=|P_i-P_r|$, after all quantities have been converted into dBm).

At step 314, control module 266 may estimate $\epsilon_n$=Directivity-$\Gamma^2$, where directivity is an ideal ratio of incident and reflected power, which may be a characteristic of RF coupler 242 that measures the coupler's effectiveness in isolating two opposite-traveling (incident and reflected) signals. In a system with no transmission line mismatch, Directivity=$\Gamma^2$. Accordingly, $\epsilon_n$ may represent an error value indicative of a estimated return loss of an for an antenna load, where n corresponds to a current step setting of an antenna tuner 217.

At step 316, control module 266 may determine whether $\epsilon_n$ is greater or equal to a particular threshold (e.g., 3 decibels). If $\epsilon_n$ is greater or equal to the particular threshold, method 300 may proceed to step 318. Otherwise, method 300 may return to step 324.

At step 318, in response to a determination that $\epsilon_n$ is greater or equal to the particular threshold, control module 266 may determine if $\epsilon_n$ is greater or equal to $\epsilon_{n-1}$ where n−1 corresponds to the next lower step setting of antenna tuner 217. If $\epsilon_n$ is greater or equal to $\epsilon_{n-1}$, method 300 may proceed to step 320. Otherwise, method 300 may proceed to step 322.

At step 320, control module 266 may communicate control signals to antenna tuner 217 such that antenna tuner 217 is stepped to its next higher setting (e.g., capacitances of varactors 215 increases by the smallest amount possible). After completion of step 320, method 300 may proceed again to step 304.

At step 322, in response to a determination that $\epsilon_n$ is not greater or equal to $\epsilon_{n-1}$, control module 266 may communicate control signals to antenna tuner 217 such that antenna tuner 217 is stepped to its next lower setting (e.g., capacitances of varactors 215 decreases by the smallest amount possible). After completion of step 322, method 300 may proceed again to step 304.

At step 324, in response to a determination that $\epsilon_n$ is lesser than the particular threshold, control module 266 may set the present antenna tuner setting as the calibrated antenna tuner setting. At step 326, control module 266 may store current environmental parameters (e.g., as indicated by environmental parameter signals from environment sensors 281) and the calibrated antenna tuner setting as an entry in memory 268 for later recall. At step 328, antenna tuner 217 may operate at the calibrated antenna tuner setting until later modified. After completion of step 328, method 300 may end.

Although FIG. 3 discloses a particular number of steps to be taken with respect to method 300, it is understood that method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using system 100 or any other system operable to implement method 300. In certain embodiments, method 300 may be implemented partially or fully in software embodied in computer-readable media.

Figure 4:
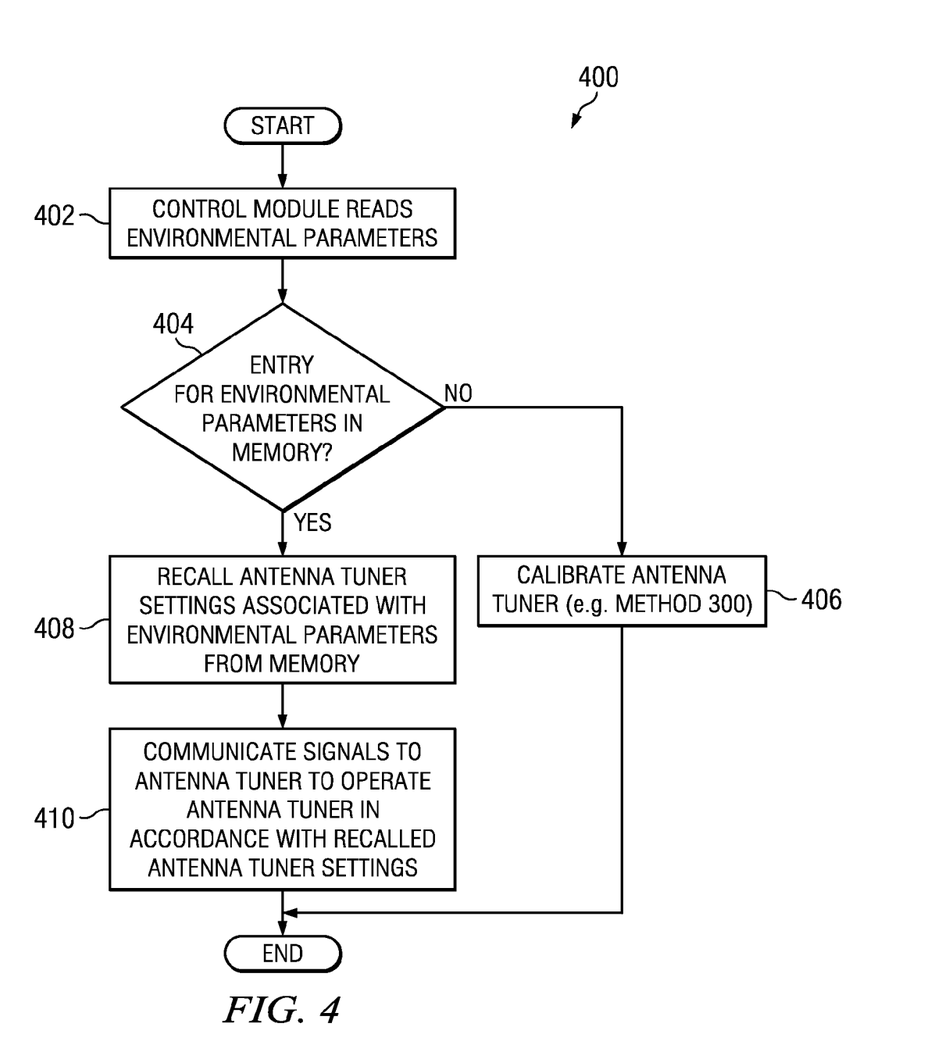
FIG. 4 illustrates a flow chart of an example method for selecting an antenna tuner setting, in accordance with embodiments of the present disclosure.

FIG. 4 illustrates a flow chart of an example method 400 for selecting an antenna tuner setting, in accordance with embodiments of the present disclosure. Method 400 may be initiated in any suitable manner (e.g., in response to user input, in response to a chance in environmental parameters, etc.). According to one embodiment, method 400 preferably begins at step 402. As noted above, teachings of the present disclosure may be implemented in a variety of configurations of system 100. As such, the preferred initialization point for method 400 and the order of the steps 402-410 comprising method 400 may depend on the implementation chosen.

At step 402, control module 266 may read the present environmental parameters communicated from environment sensors 281. At step 404, control module 266 may determine if an entry for the present environmental parameters exists in memory 268. If an entry does not exist for the present environmental parameters, method 400 may proceed to step 406. Otherwise, method 400 may proceed to step 408.

At step 406, in response to a determination that an entry does not exist in memory 268 for the present environmental parameters, control module 266 may perform a calibration procedure, such as that set forth in method 300, for example. After completion of step 406, method 300 may end.

At step 408, in response to a determination that an entry exists in memory 268 for the present environmental parameters, control module 266 may recall from memory 268 antenna tuner settings associated with the present environmental parameters. At step 410, based on the recalled antenna tuner settings, control module 266 may communicate control signals to antenna tuner 217 such that antenna tuner 217 operates in accordance with the recalled antenna tuner settings associated with the present environmental parameters. After completion of step 410, method 400 may end.

Although FIG. 4 discloses a particular number of steps to be taken with respect to method 400, it is understood that method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using system 100 or any other system operable to implement method 400. In certain embodiments, method 400 may be implemented partially or fully in software embodied in computer-readable media.

Modifications, additions, or omissions may be made to system 100 from the scope of the disclosure. The components of system 100 may be integrated or separated. Moreover, the operations of system 100 may be performed by more, fewer, or other components. As used in this document, "each" refers to each member of a set or each member of a subset of a set.

Although the present disclosure has been described with several embodiments, various changes and modifications may be suggested to one skilled in the art. It is intended that the present disclosure encompass such changes and modifications as fall within the scope of the appended claims.

What is claimed is:

1. A wireless communication element, comprising:
    a receive path configured to receive a first wireless communication signal and convert the first wireless communication signal into a first digital signal based at least on an oscillator signal;
    a transmit path configured to convert a second digital signal into a second wireless communication signal based at least on the oscillator signal;
    an antenna coupled to the receive path and the transmit path and configured to transmit the second wireless communication signal;
    an antenna tuner coupled to the transmit path and the antenna;
    one or more environment sensors; and
    a control path coupled to the antenna and the antenna tuner, the control path configured to:
        receive one or more environment parameter signals from the one or more environment sensors, the one or more environment parameter signals indicative of an environment of the wireless communication element;
        determine if an entry exists in a memory of the wireless communication element associated with the one or more environment parameter signals;
    upon a determination that the entry does not exist, the control path further configured to:
        sense an incident power transmitted to the antenna, and a reflected power reflected from the antenna;
        determine a complex reflection coefficient based on the incident power and the reflected power;
        calibrate an antenna tuner setting such that a determined error value, indicative of an estimated return loss for an antenna load, is less than a threshold error value, the determined error value based on a directivity value and a square of the reflection coefficient; and
        store the entry in the memory, the entry associating the one or more environment parameter settings with the antenna tuner setting; and
    upon a determination that the entry does exist, the control path further configured to:
        determine the antenna tuner setting associated with the one or more environment parameter signals based on the entry; and
        based on the antenna tuner setting, communicate one or more control signals to the antenna tuner for controlling an impedance of the antenna tuner.

2. A wireless communication element according to claim 1, the antenna tuner comprising one or more variable capacitors, the one or more control signals to the antenna tuner for controlling the capacitances of the one or more variable capacitors.

3. A wireless communication element according to claim 1, wherein the one or more environment parameter signals comprises a signal indicative of an orientation of the wireless communication element relative to the center of the earth.

4. A wireless communication element according to claim 1, wherein the one or more environment parameter signals comprises a signal indicative of a location of the wireless communication element.

5. A wireless communication element according to claim 1, wherein the one or more environment parameter signals comprises a signal indicative of proximity of the wireless communication element to a user of the wireless communication element.

6. A control path for control of an antenna tuner, comprising:
    a control module coupled to an antenna tuner, the control module configured to:
        receive one or more environment parameter signals from one or more environment sensors, the one or more environment parameter signals indicative of an environment of a wireless communication element; and
    a memory communicatively coupled to the control module, the memory configured to store one or more entries, each entry associating an antenna tuner setting for the antenna tuner to one or more environment parameter signals;
    the control module is further configured to determine if an entry exists in the memory associated with the one or more environment parameter signals;

upon a determination that the entry does not exist, the control module further configured to:
  sense an incident power transmitted to the antenna, and a reflected power reflected from the antenna;
  determine a complex reflection coefficient based on the incident power and the reflected power;
  calibrate an antenna tuner setting such that a determined error value, indicative of an estimated return loss for an antenna load, is less than a threshold error value, the determined error value based on a directivity value and a square of the reflection coefficient; and
  store the entry in the memory, the entry associating the one or more environment parameter settings with the antenna tuner setting; and
upon a determination that the entry does exist, the control module further configured to:
  determine the antenna tuner setting associated with the one or more environment parameter signals based on the entry; and
  based on the antenna tuner setting, communicate one or more control signals to the antenna tuner for controlling an impedance of the antenna tuner.

7. A control path according to claim 6, the antenna tuner comprising one or more variable capacitors, the one or more control signals to the antenna tuner for controlling the capacitances of the one or more variable capacitors.

8. A control path according to claim 6, wherein the one or more environment parameter signals comprises a signal indicative of an orientation of the wireless communication element relative to the center of the earth.

9. A control path according to claim 6, wherein the one or more environment parameter signals comprises a signal indicative of a location of the wireless communication element.

10. A control path according to claim 6, wherein the one or more environment parameter signals comprises a signal indicative of proximity of the wireless communication element to a user of the wireless communication element.

11. A method performed by a wireless communication element, comprising:
  receiving one or more environment parameter signals from one or more environment sensors, the one or more environment parameter signals indicative of an environment of a wireless communication element;
  determining if an entry exists in a memory of the wireless communication element, the entry associated with the one or more environment parameter signals;
  upon determining that the entry does not exist:
    sensing an incident power transmitted to the antenna and a reflected power reflected from the antenna;
    determining a complex reflection coefficient based on the incident power and the reflected power;
    calibrating an antenna tuner setting such that a determined error value, indicative of an estimated return loss for an antenna load, is less than a threshold error value, the determined error value based on a directivity value and a square of the reflection coefficient; and
    storing an entry in the memory, the entry associating the one or more environment parameter settings with an antenna tuner setting associated with the calibration of the antenna tuner;
  upon determining that the entry does exist:
    determining the antenna tuner setting associated with the one or more environment parameter signals based on the entry; and
    based on the antenna tuner setting, communicating one or more control signals to an antenna tuner of the wireless communication element for controlling an impedance of the antenna tuner.

12. A method according to claim 1, the antenna tuner comprising one or more variable capacitors, the one or more control signals to the antenna tuner for controlling the capacitances of the one or more variable capacitors.

13. A method according to claim 1, wherein the one or more environment parameter signals comprises a signal indicative of an orientation of the wireless communication element relative to the center of the earth.

14. A method according to claim 1, wherein the one or more environment parameter signals comprises a signal indicative of a location of the wireless communication element.

15. A method according to claim 1, wherein the one or more environment parameter signals comprises a signal indicative of proximity of the wireless communication element to a user of the wireless communication element.

* * * * *